(12) United States Patent
Johnson et al.

(10) Patent No.: US 11,132,340 B2
(45) Date of Patent: *Sep. 28, 2021

(54) STORAGE UNIT SELECTION OF MEMORY DEVICES USED FOR DISTRIBUTED STORAGE NETWORK MEMORY

(71) Applicant: International Business Machines Corporation, Armonk, NY (US)

(72) Inventors: Trent W. Johnson, Chicago, IL (US); Andrew D. Baptist, Mt. Pleasant, WI (US); Ilya Volvovski, Chicago, IL (US); John Quigley, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 399 days.

This patent is subject to a terminal disclaimer.

(21) Appl. No.: 16/171,480

(22) Filed: Oct. 26, 2018

(65) Prior Publication Data

US 2019/0065524 A1  Feb. 28, 2019

Related U.S. Application Data

(63) Continuation of application No. 15/810,426, filed on Nov. 13, 2017, now Pat. No. 10,169,369, which is a
(Continued)

(51) Int. Cl.
*G06F 16/00* (2019.01)
*G06F 16/182* (2019.01)
(Continued)

(52) U.S. Cl.
CPC ........... *G06F 16/182* (2019.01); *G06F 11/10* (2013.01); *G06F 11/1076* (2013.01);
(Continued)

(58) Field of Classification Search
None
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Anhtai V Tran
(74) *Attorney, Agent, or Firm* — Garlick & Markison; Edward J. Marshall

(57) ABSTRACT

A storage unit in a distributed storage network (DSN) transmits resource availability information to a managing unit. The resource availability information includes information indicating a number of available memory devices of the storage unit that are available to be used for storage of encoded data slices. The storage unit receives resource assignment information determined by the managing unit. The resource assignment information includes one or more dispersal parameters, information identifying a set of storage units to be included in a newly instantiated DSN memory, and a DSN address range assigned to the storage unit for use in the newly instantiated DSN memory. The storage unit selects particular available memory devices of the storage unit to assign to the newly instantiated DSN memory. The selection is based on the resource assignment information.

19 Claims, 6 Drawing Sheets

Related U.S. Application Data continuation-in-part of application No. 15/428,390, filed on Feb. 9, 2017, now Pat. No. 9,921,907, which is a continuation of application No. 14/306,335, filed on Jun. 17, 2014, now Pat. No. 9,652,470.

(60) Provisional application No. 61/841,625, filed on Jul. 1, 2013.

(51) Int. Cl.
    *H04L 29/08*     (2006.01)
    *G06F 11/10*     (2006.01)
    *G06F 16/23*     (2019.01)
    *H04L 29/06*     (2006.01)

(52) U.S. Cl.
    CPC ...... *G06F 16/2379* (2019.01); *H04L 67/1097* (2013.01); *H04L 63/101* (2013.01); *H04L 63/20* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,002,805 B1 | 4/2015 | Barber | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0289122 A1 | 11/2011 | Grube | |
| 2012/0054581 A1* | 3/2012 | Grube ................. | G06F 12/0223 714/769 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

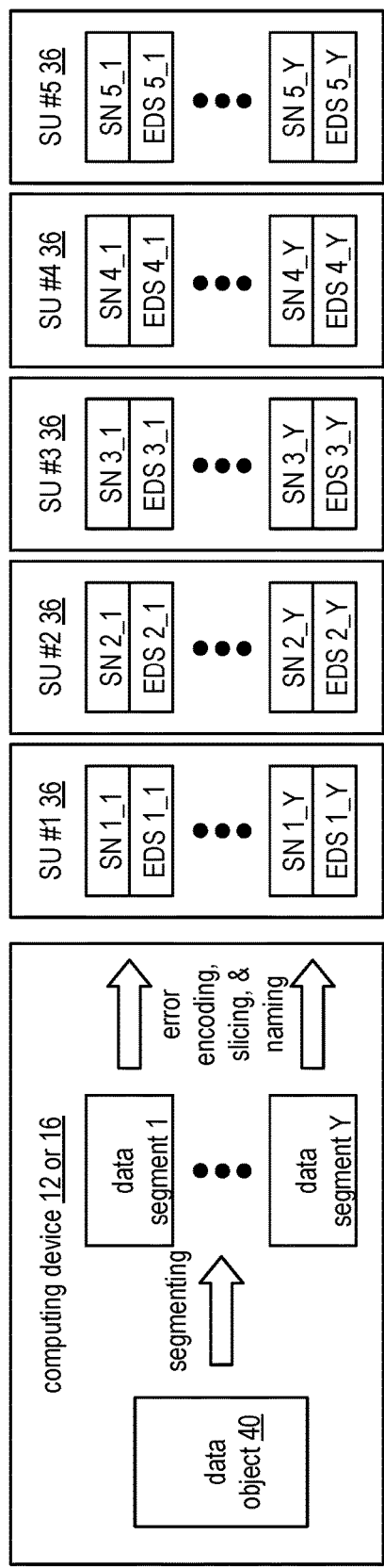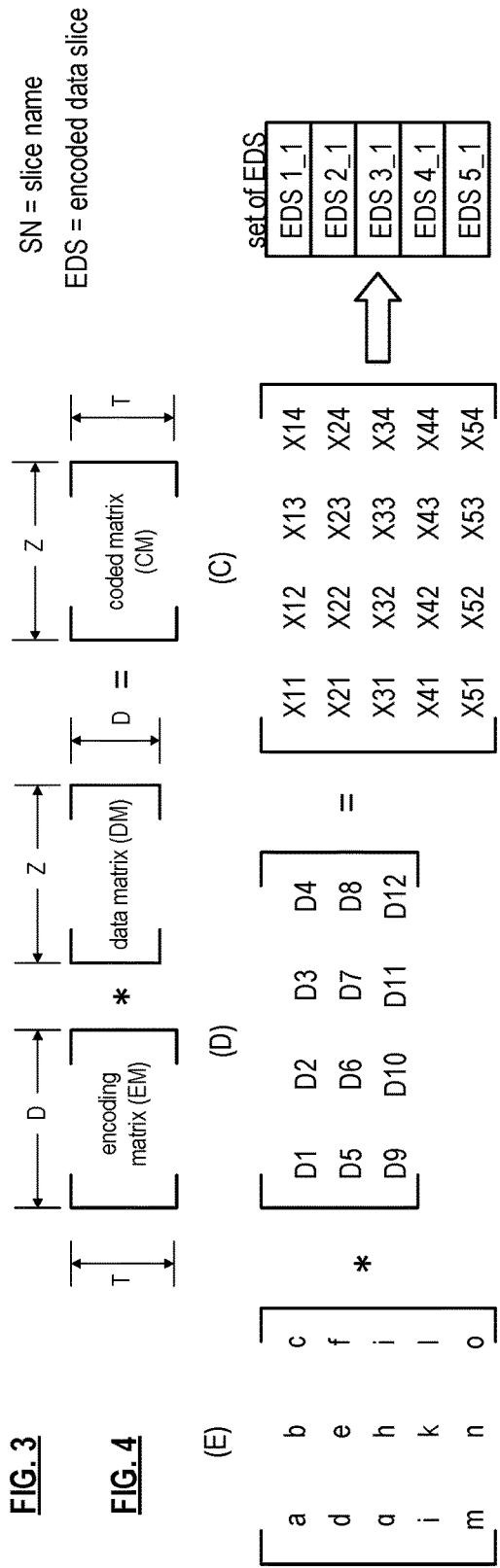

STORAGE UNIT SELECTION OF MEMORY DEVICES USED FOR DISTRIBUTED STORAGE NETWORK MEMORY

CROSS-REFERENCE TO RELATED APPLICATIONS

The present U.S. Utility Patent Application claims priority pursuant to 35 U.S.C. § 120 as a continuation of U.S. Utility application Ser. No. 15/810,426, entitled "MEETING STORAGE REQUIREMENTS WITH LIMITED STORAGE RESOURCES", filed Nov. 13, 2017, which is a continuation-in-part of U.S. Utility application Ser. No. 15/428,390, entitled "TIME-SENSITIVE DATA STORAGE OPERATIONS IN A DISPERSED STORAGE NETWORK", filed Feb. 9, 2017, issued as U.S. Pat. No. 9,921,907 on Mar. 20, 2018, which claims priority pursuant to 35 U.S.C. § 120 as a continuation of U.S. Utility application Ser. No. 14/306,335, entitled "STORING DATA IN A DISPERSED STORAGE NETWORK", filed Jun. 17, 2014, issued as U.S. Pat. No. 9,652,470 on May 16, 2017, which claims priority pursuant to 35 U.S.C. § 119(e) to U.S. Provisional Application No. 61/841,625, entitled "PRIORITIZING TASKS IN A DISPERSED STORAGE NETWORK", filed Jul. 1, 2013, all of which are hereby incorporated herein by reference in their entirety and made part of the present U.S. Utility Patent Application for all purposes.

BACKGROUND

This invention relates generally to computer networks and more particularly to dispersing error encoded data.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Requirements for availability, reliability and efficiency of various memories used in distributed storage systems can be a function of how the data is encoded and dispersed. But known systems do not have the flexibility for allowing arbitrary selection of how data is encoded and dispersed, because particular encoding and dispersal algorithms tend to be fixed, and require a fixed quantity of storage resources. This lack of flexibility renders current storage solutions less than perfect.

SUMMARY

According to an embodiment of the present invention, a managing unit included in a distributed storage network (DSN) determines resource availability information. The resource availability information includes information indicating a number of memory devices available to be used for storage of encoded data slices. The management unit then chooses dispersal parameters based on the resource availability information. The dispersal parameters are chosen to satisfy a performance threshold associated with storage of the encoded data slices in the DSN, but subject to a constraint requiring a pillar width associated with the encoded data slices to be no larger than the number of memory devices available. The management unit creates a number of storage units, wherein the number of storage units is constrained to be greater than the pillar width, and wherein one or more of the number of memory devices is assigned to each of the number of storage units. The management unit then instantiates a DSN memory that includes the number of storage units.

The management unit can also assign DSN address ranges to the number of storage units; and allocating sub-DSN address ranges to particular memory devices of the number of storage units. In some embodiments, the managing unit attempts to equalize an amount of total storage allocated to each of the number of storage units by assigning the DSN address ranges based on utilization of each of the storage units. Allocation of the sub-DSN address ranges to the particular memory devices can be based on utilization of the particular memory devices within the storage units.

Instantiating the DSN memory can include generating resource assignment information including the dispersal parameters, and transmitting the resource assignment information to the number of storage units. In various implementations, the resource assignment information can be redistributed throughout the DSN, including to devices other than the number of storage units.

In various embodiments, dispersal parameters are chosen to minimize shared hardware resources, where possible, to improve the likelihood that performance thresholds will be met. For example, a performance threshold can require one or more of a particular mean time to data loss, or a specified write availability. These thresholds can be applied on a per storage unit basis, a per memory device basis, or on a per DSN memory basis. In various embodiments, a pillar width associated with encoded data slices is chosen so that an estimated performance satisfies both mean time to data loss and write availability requirements.

BRIEF DESCRIPTION OF THE DRAWINGS

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION

Figure 1:
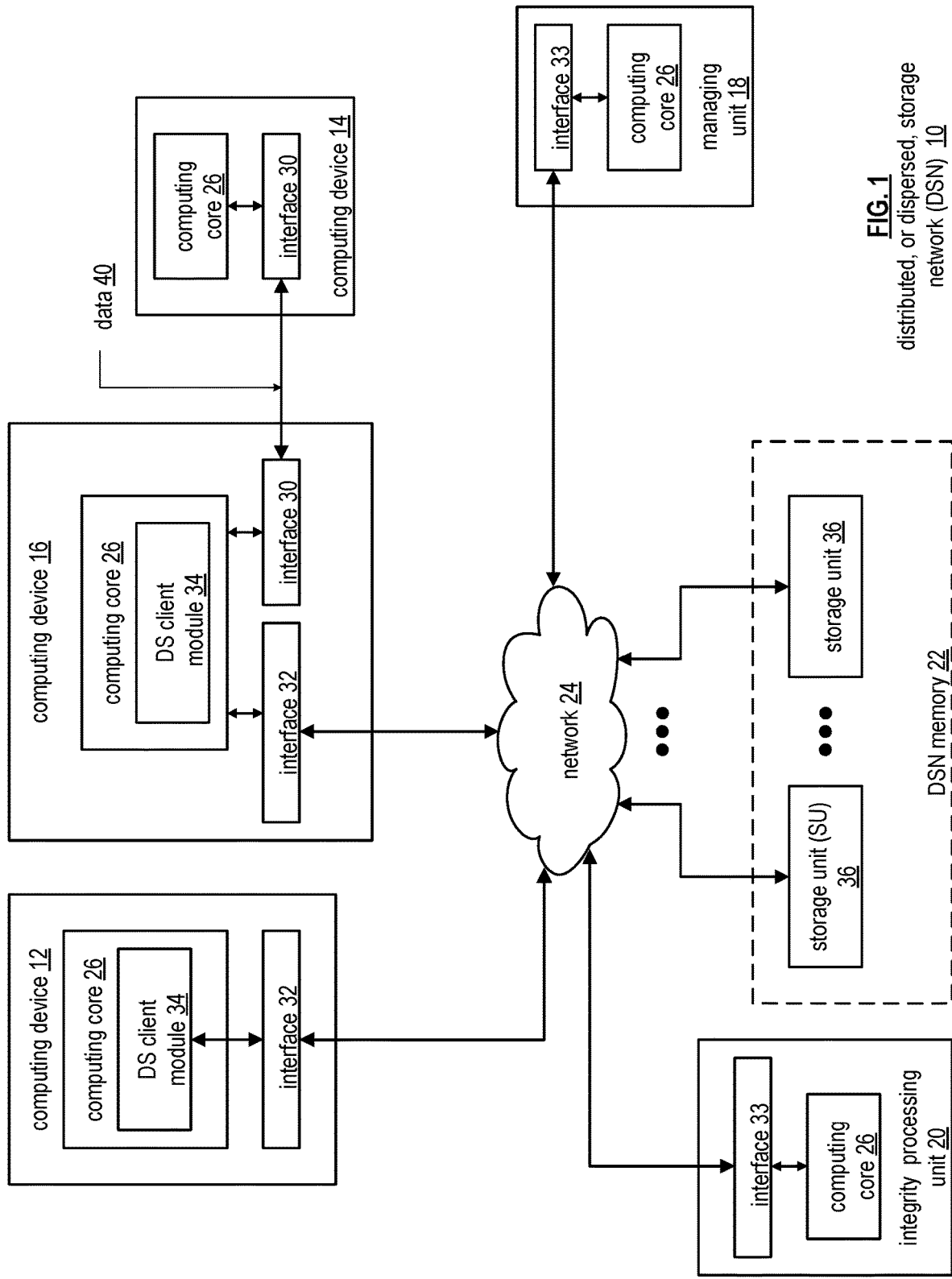
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
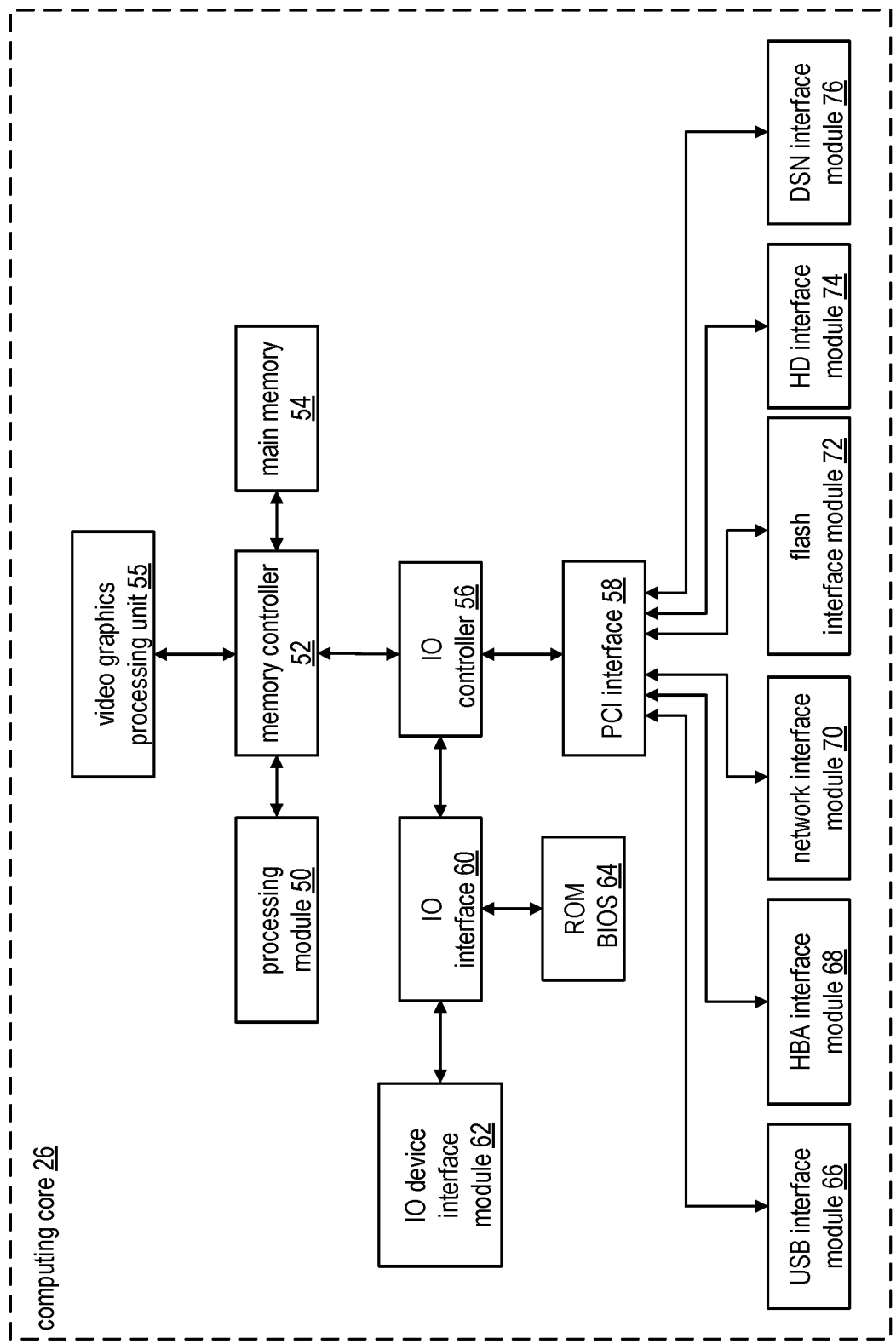
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
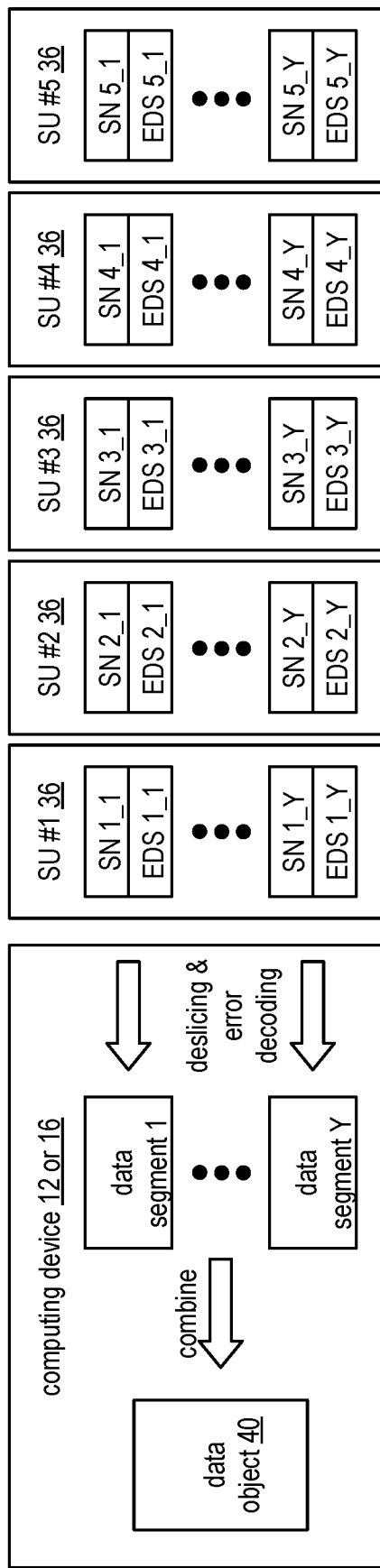
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
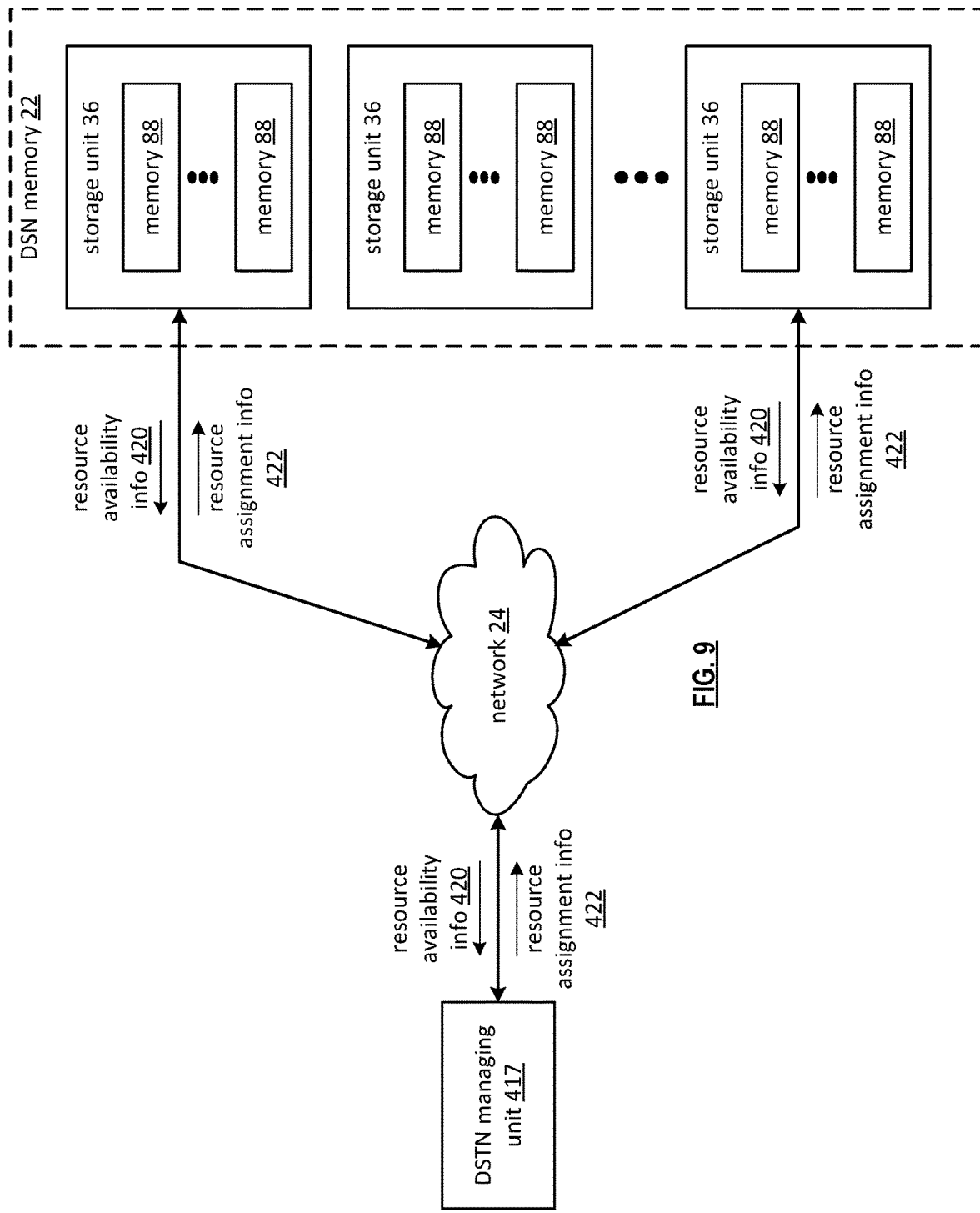
FIG. 9 is a schematic block diagram of an embodiment of a dispersed storage network in accordance with the present invention.
Figure 10:
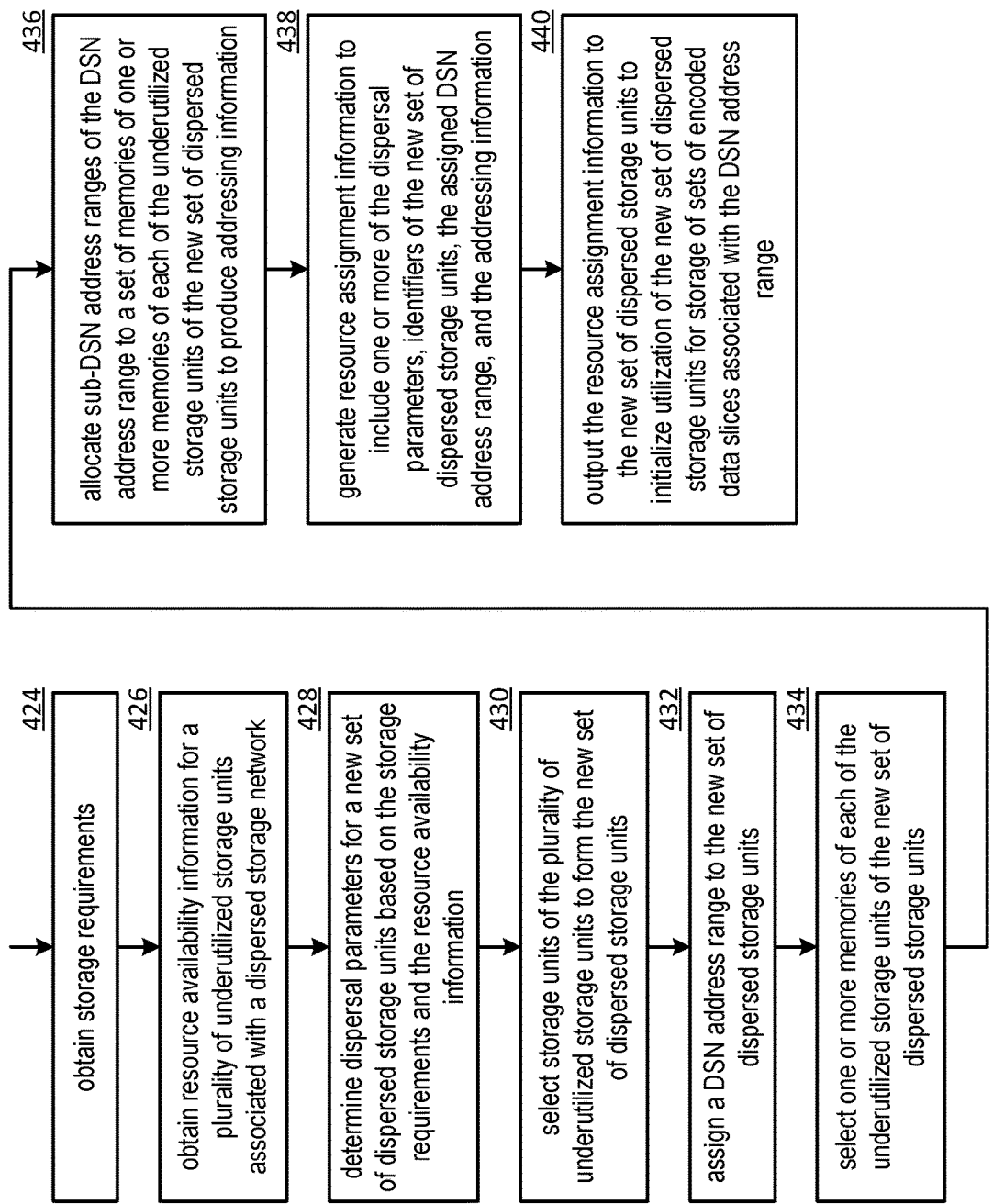
FIG. 10 is a flowchart illustrating an example of assigning storage resources in accordance with the present invention.

Referring next to FIGS. 9 and 10, various embodiments in which a distributed storage network (DSN) can provide flexibility in meeting storage requirements using limited storage resources will be discussed. Storage requirements, including availability, reliability, efficiency, in a DSN memory can be considered a function of the dispersal parameters, such as width, threshold, write threshold, etc., but the flexibility for selecting arbitrary dispersal parameters is limited by the storage resources, such as the number of memory devices, the number of other associated physical components, the number of physical locations, and the like.

In at least one implementation, a process for meeting storage requirements given a fixed set of storage resources begins by determining a set of dispersal requirements that meets the requirements, e.g., certain Mean time to data loss, or write availability, with the constraint that the width must be no larger than the total number of memory devices available. The process determines a number of DS units, sometimes referred to as storage units, to allocate with the constraint that this number must be greater than the chosen width, and creates those DS units.

Each DS unit is assigned some set of the memory devices which it will use for storing and retrieving slices. The process may attempt to equalize the total quantity of storage available to each ds unit. As for the other physical hardware, aside from the memory devices themselves, each DS unit may have its own hardware components, or some of the hardware components may be shared, e.g., shared chassis, shared network interface, shared CPU, shared random access memory, or the like. The degree to which components are shared depends on the constraints imposed by the limited available storage resources, but otherwise the process may optimize to share as little as possible for greater failure independence. The allocated DS units are then used to instantiate a DSN memory.

FIG. 9 is a schematic block diagram of an embodiment of a dispersed storage network (DSN) that includes distributed storage and task network (DSTN) managing unit 417, illustrated as managing unit 18 of FIG. 1, the network 24 of FIG. 1, and a dispersed storage network (DSN) memory 22 of FIG. 1. The DSN memory 22 includes a plurality of storage units 36, also shown in FIG. 1. Each storage unit 36 may be implemented using one or more of a storage server, a memory array, or the like. Each storage unit 36 includes a plurality of memories 88.

The system functions to assign operation within the DSN to a set of storage units from a plurality of storage units. The DSTN managing unit 417 performs a series of steps to assign the operation of the set of storage units. In an example of operation, the DSTN managing unit 417 obtains storage requirements. The storage requirements include one or more of a storage availability requirement, a retrieval reliability requirement, and a storage efficiency requirement. The obtaining includes at least one of initiating a query, receiving the storage requirements, performing a lookup, determining the storage requirements based on user input, receiving a storage request, and receiving an error message.

The DSTN managing unit 417 obtains resource availability information 420 for the plurality of storage units 36. The resource availability information 420 includes one or more of a storage capacity level, a storage utilization level, a number of memory devices within a storage unit, a number of active memory devices, capacity of each memory device, utilization of each memory device, and an input/output bandwidth capacity level. The obtaining includes at least one of initiating a query, receiving a response that includes the resource availability information 420, performing a lookup, and receiving an error message.

The DSTN managing unit 417 determines dispersal parameters based on the storage requirements and the resource availability information 420. For example, the DSTN managing unit 417 generates a pillar width of the dispersal parameters to be less than or equal to a number of storage units that are available and will substantially meet the storage requirements. As another example, the DSTN managing unit 417 generates a decode threshold number of the dispersal parameters based on the generated pillar width and the storage requirements (e.g., to achieve the retrieval reliability requirement). As yet another example, the DSTN managing unit 417 generates a write threshold number of the dispersal parameters based on one or more of the pillar width, the decode threshold, and the storage requirements (e.g., to achieve the storage availability requirement).

The DSTN managing unit 417 selects the set of storage units based on the dispersal parameters and the resource availability information 420. For example, the DSTN managing unit 417 identifies storage units associated with resource availability information compatible with the storage requirements and the dispersal parameters. For instance, the DSTN managing unit selects 16 storage units associated with favorable resource availability information when the pillar width is 16.

The DSTN managing unit 417 assigns a DSN address range to the set of storage units. The assigning includes at least one of identifying a DSN address range from a to-be-assigned address range list, receiving a request, identifying a requirement for a new generation of a previous generation of a vault, identifying a new vault, and identifying an available DSN address range based on previously assigned DSN address ranges. The DSTN managing unit 417 may assign one or more memories 88 of each storage unit 36 of the selected set of storage units to sub-DSN address ranges of the assigned DSN address range to produce addressing information based on the resource availability information in the storage requirements. Alternatively, each storage unit assigns one or more memories of the storage unit. The selecting includes selecting enough memories to meet a projected storage capacity goal for an associated vault of the assigned DSN address range.

The DSTN managing unit 417 generates resource assignment information 422 to include one or more of the dispersal parameters, identifiers of the set of storage units, the assigned DSN address range, and the addressing information. The DSTN managing unit 417 outputs the resource assignment information 422 to each storage unit of the set of storage units to initialize utilization of the set of storage units for storage of sets of encoded data slices. The outputting includes sending the resource assignment information 422 directly to the set of storage units and sending the resource assignment information 422 via the DSTN managing unit 417 for redistribution as registry information to numerous DSN entities including the set of storage units.

FIG. 10 is a flowchart illustrating an example of assigning storage resources. The method begins with step 424 where a processing module (e.g., of a distributed storage and task network (DSTN) managing unit) obtains storage requirements. The method continues at step 426 where the processing module obtains resource availability information for a plurality of underutilized storage units associated with a dispersed storage network (DSN) memory. The method continues at step 428 where the processing module determines dispersal parameters for a new set of dispersed storage units based on the storage requirements and the resource availability information. For example, the processing module determines the dispersal parameters to achieve a mean time to data loss goal and/or a write availability goal.

The method continues at step 430 where the processing module selects storage units of the plurality of underutilized storage units to form the new set of dispersed storage units. The selecting the storage units may be based on the dispersal parameters and the resource availability information such that operation of the new set of dispersed storage units substantially achieves the storage requirements. The method continues at step 432 where the processing module assigns a DSN address range to the new set of dispersed storage units.

The method continues at step 434 where the processing module selects one or more memories of each of the underutilized storage units of the new set of dispersed storage units. The method continues at step 436 where the processing module allocates sub-DSN address ranges of the DSN address range to a set of memories of one or more memories of each of the underutilized storage units of the new set of dispersed storage units to produce addressing information. For example, the processing module divides a DSN address range for a storage unit by a number of available memories for the dispersed storage unit to produce the sub-DSN address ranges for the dispersed storage unit.

The method continues at step 438 where the processing module generates resource assignment information to include one or more of the dispersal parameters, identifiers of the new set of dispersed storage units, the assigned DSN address range, and the addressing information. The method continues at step 440 where the processing module outputs the resource assignment information to the new set of dispersed storage units to initialize utilization of the new set of dispersed storage units for storage of sets of encoded data slices associated with the DSN address range.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for use in a distributed storage network (DSN), the method comprising:
    transmitting resource availability information from a storage unit to a managing unit, the resource availability information including information indicating a number of available memory devices of the storage unit that are available to be used for storage of encoded data slices;
    receiving, at the storage unit, resource assignment information determined by the managing unit, the resource assignment information including:
        one or more dispersal parameters;
        information identifying a set of storage units to be included in a newly instantiated DSN memory;
        a DSN address range assigned to the storage unit for use in the newly instantiated DSN memory; and selecting, by the storage unit, particular available memory devices of the storage unit to assign to the newly instantiated DSN memory based on the resource assignment information.

2. The method of claim 1, further comprising:
allocating, by the storage unit, sub-DSN address ranges to the particular available memory devices.

3. The method of claim 1, wherein:
the one or more dispersal parameters are selected by the managing unit to satisfy a performance threshold associated with storage of the encoded data slices, subject to a constraint requiring a pillar width associated with the encoded data slices to be no larger than the number of available memory devices.

4. The method of claim 1, wherein:
the one or more dispersal parameters are selected to achieve a target mean time to data loss and a target write availability.

5. The method of claim 2, further comprising:
allocating the sub-DSN address ranges to the particular available memory devices based, at least in part, on utilization of the particular available memory devices.

6. The method of claim 2, wherein:
the sub-DSN address ranges are allocated based on the one or more dispersal parameters.

7. The method of claim 2, wherein:
the sub-DSN address ranges are determined by dividing the DSN address range assigned to the storage unit by the number of available memory devices of the storage unit.

8. A computing device for use in a distributed storage network (DSN), the computing device comprising:
a processor;
memory operably associated with the processor and storing a program of instructions, upon execution by the processor, causing the processor to implement a storage unit configured to:
transmit resource availability information to a managing unit, the resource availability information including information indicating a number of available memory devices of the storage unit that are available to be used for storage of encoded data slices;
receive resource assignment information determined by the managing unit, the resource assignment information including:
one or more dispersal parameters;
information identifying a set of storage units to be included in a newly instantiated DSN memory;
a DSN address range assigned to the storage unit for use in the newly instantiated DSN memory; and
select particular available memory devices of the storage unit to assign to the newly instantiated DSN memory based on the resource assignment information.

9. The computing device of claim 8, the storage unit further configured to:
allocate sub-DSN address ranges to the particular available memory devices.

10. The computing device of claim 8, wherein:
the one or more dispersal parameters are selected by the managing unit to satisfy a performance threshold associated with storage of the encoded data slices, subject to a constraint requiring a pillar width associated with the encoded data slices to be no larger than the number of available memory devices.

11. The computing device of claim 8, wherein:
the one or more dispersal parameters are selected to achieve a target mean time to data loss and a target write availability.

12. The computing device of claim 9, the storage unit further configured to:
allocate the sub-DSN address ranges to the particular available memory devices based, at least in part, on utilization of the particular available memory devices.

13. The computing device of claim 9, wherein:
the sub-DSN address ranges are allocated based on the one or more dispersal parameters.

14. The computing device of claim 9, wherein:
the sub-DSN address ranges are determined by dividing the DSN address range assigned to the storage unit by the number of available memory devices of the storage unit.

15. A distributed storage network (DSN) comprising:
a plurality of storage units logically organized into DSN memories, each of the plurality of storage units including memory devices configured to store error encoded data slices;
a managing unit coupled to the plurality of storage units;
each storage unit including a processor and associated memory configured to:
transmit resource availability information to the managing unit, the resource availability information including information indicating a number of available memory devices of the storage unit that are available to be used for storage of encoded data slices;
receive resource assignment information determined by the managing unit, the resource assignment information including:
one or more dispersal parameters;
information identifying a set of storage units to be included in a newly instantiated DSN memory;
a DSN address range assigned to the storage unit for use in the newly instantiated DSN memory; and
select particular available memory devices of the storage unit to assign to the newly instantiated DSN memory based on the resource assignment information.

16. The distributed storage network (DSN) of claim 15, each storage unit further configured to:
allocate sub-DSN address ranges to the particular available memory devices.

17. The distributed storage network (DSN) of claim 15, wherein:
the one or more dispersal parameters are selected by the managing unit to satisfy a performance threshold associated with storage of the encoded data slices, subject to a constraint requiring a pillar width associated with the encoded data slices to be no larger than the number of available memory devices.

18. The distributed storage network (DSN) of claim 16, each storage units further configured to:
allocate the sub-DSN address ranges to the particular available memory devices based, at least in part, on utilization of the particular available memory devices.

19. The distributed storage network (DSN) of claim 16, each storage units further configured to:
determine the sub-DSN address ranges by dividing the DSN address range assigned to the storage unit by the number of available memory devices of the storage unit.

\* \* \* \* \*